Dec. 11, 1951  J. BASS  2,578,498
COMBINATION CAMERA AND DEVELOPER
Filed June 13, 1949  3 Sheets-Sheet 1
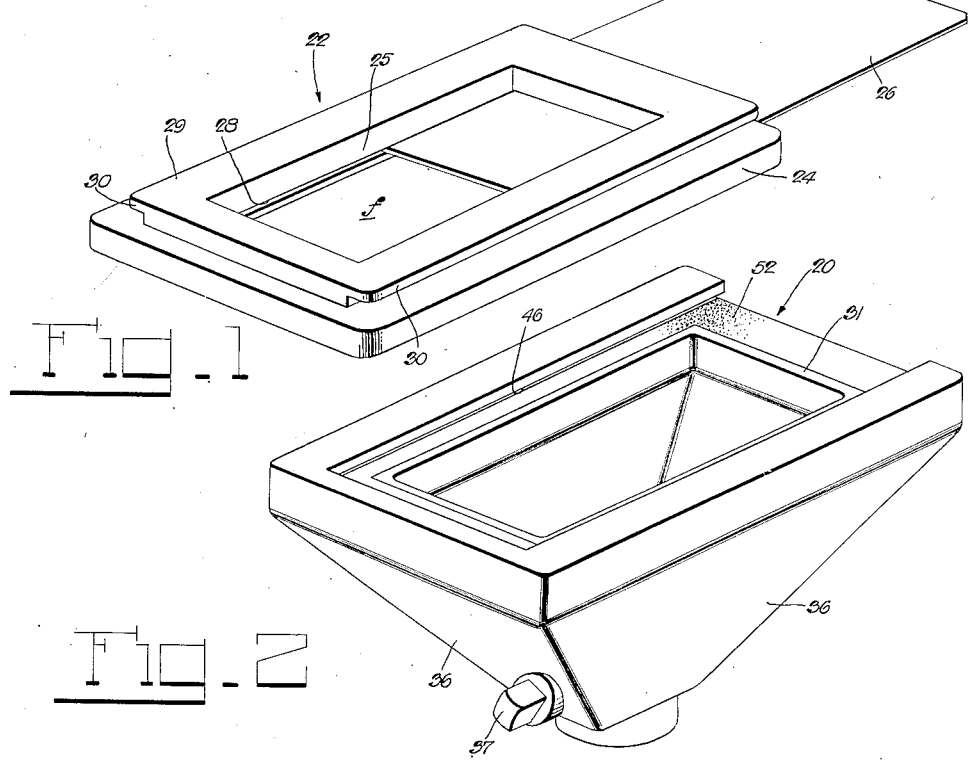
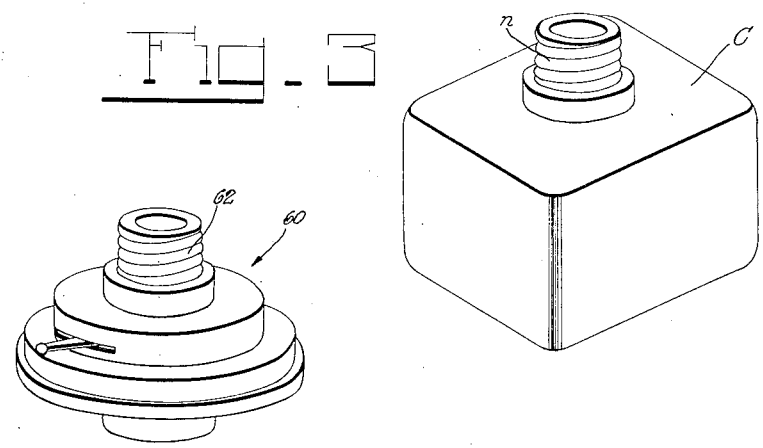
INVENTOR.
JOHN BASS
BY Edwin Levisohn &
Harry Cohen
ATTORNEYS.

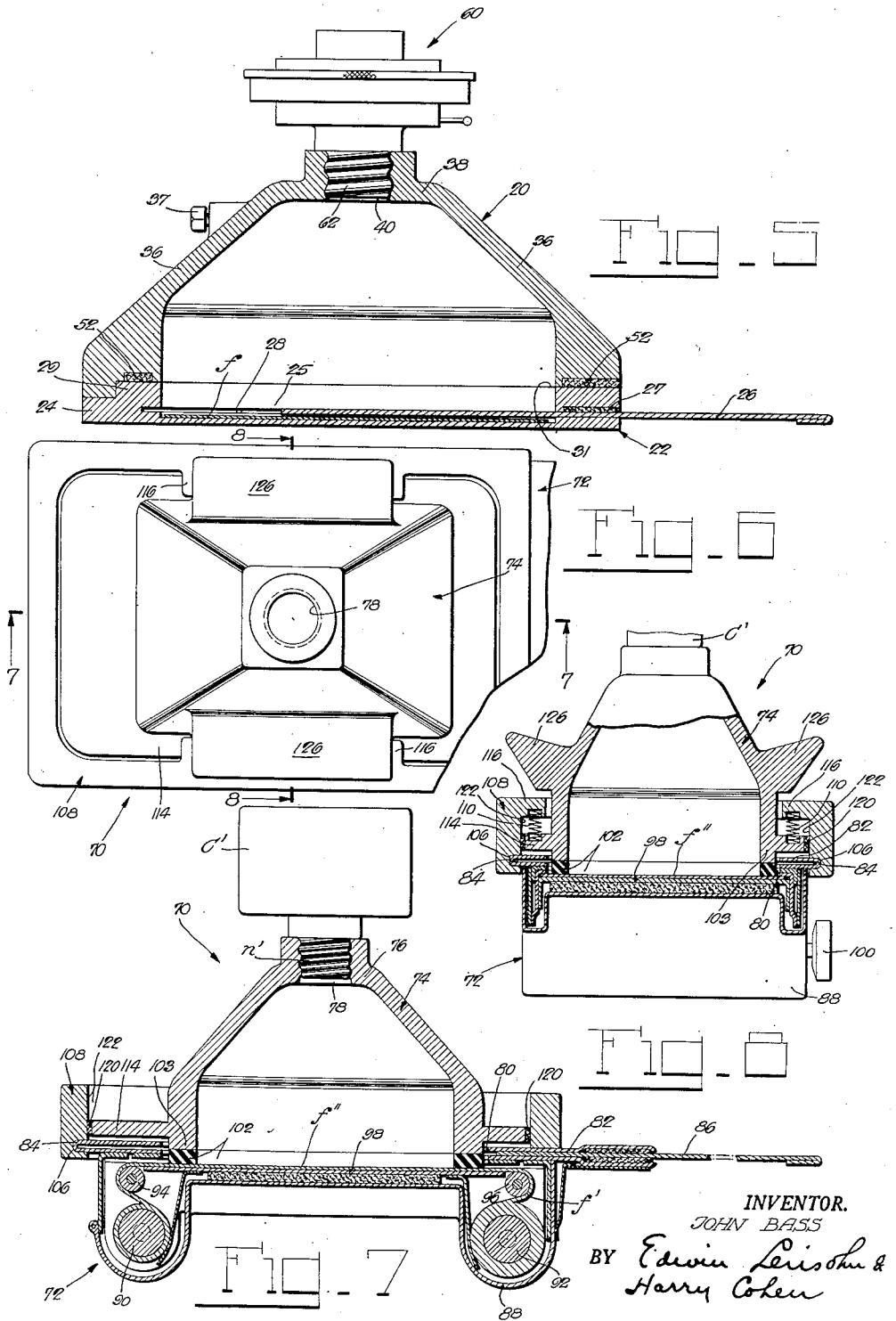

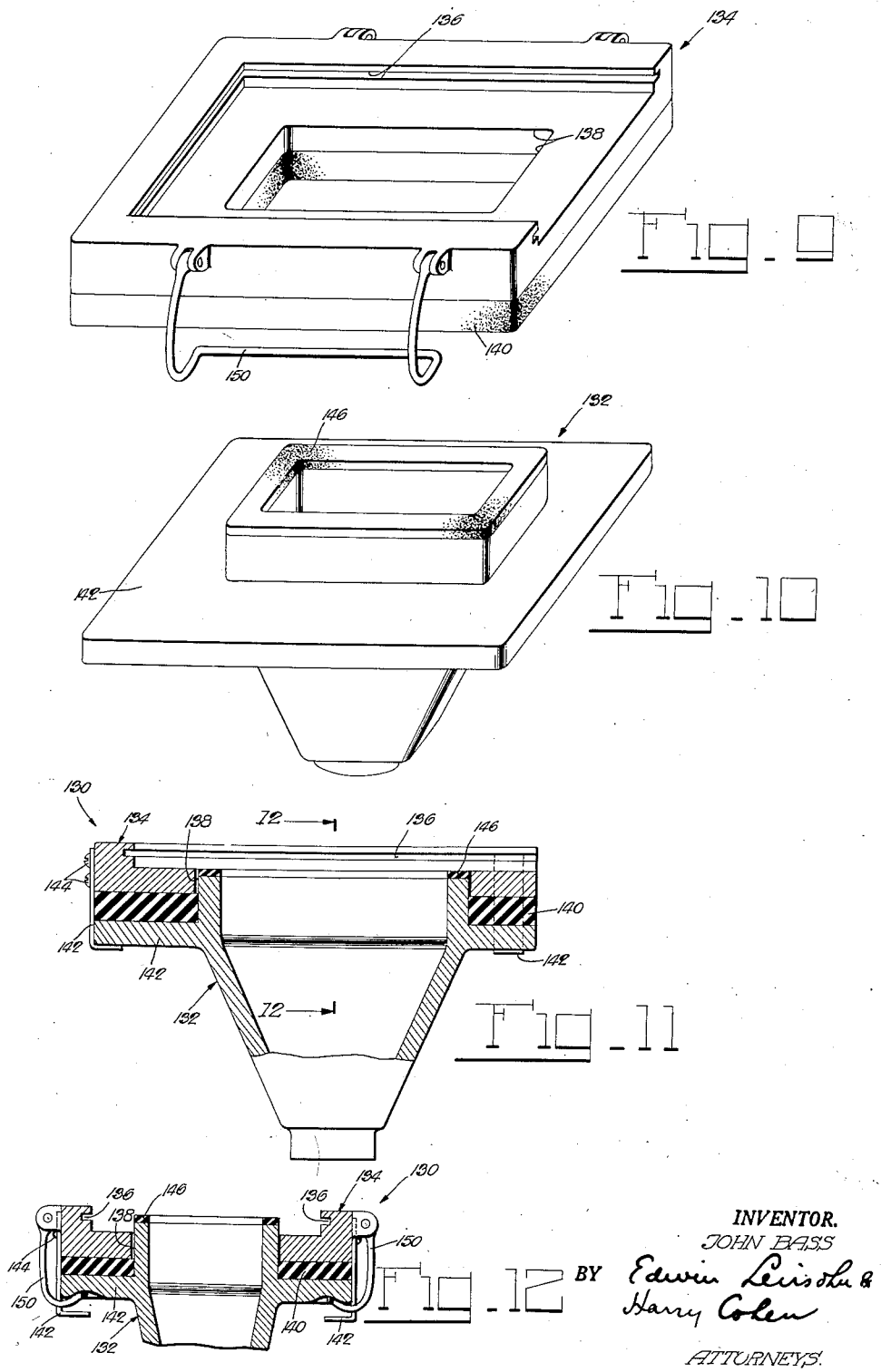

Patented Dec. 11, 1951

2,578,498

UNITED STATES PATENT OFFICE 2,578,498

COMBINATION CAMERA AND DEVELOPER

John Bass, New York, N. Y.

Application June 13, 1949, Serial No. 98,768

5 Claims. (Cl. 95—13)

This invention relates to photography in general, and to combination film cameras and developers in particular.

It is the primary object of the present invention to provide a combination camera and developer to which a film holder is releasably attachable, and which through selective use thereof may serve to expose the film or other sensitized material in the attached holder, or safely to develop the exposed film while remaining in the attached holder, or both.

It is another object of the present invention to provide a combination camera and developer of this type which is of extremely simple construction and of which the entire structure, except a lens mechanism thereof, participates in both of its performances as a camera and a developer.

It is another object of the present invention to make provisions in the instant combination camera and developer for the releasable attachment thereto of a roll-film holder, and for the exposure and, if desired, immediate safe development therein of any exposed length of the roll-film.

It is another object of the present invention to provide the instant combination camera and developer with a housing to which a film holder is releasably attachable and which forms the case of a camera or a developing tank, and to which is further releasably attachable a lens mechanism for the conversion of the housing into a camera.

It is also among the objects of the present invention to provide the instant combination camera and developer with the same releasable attachment as that provided on conventional cameras for the reception of conventional film holders, thereby to adapt the latter for ready use with the instant camera and developer.

The above and other objects, features and advantages of the present invention will be more fully understood from the following description considered in connection with the accompanying illustrative drawings.

In the drawings:

Fig. 1 is a perspective view of a conventional type of film holder;

Fig. 2 is a perspective view of one of the parts of a combination camera and developer embodying the present invention;

Figs. 3 and 4 are perspective views of other parts, respectively, of the instant camera and developer, usable interchangeably with the part thereof shown in Fig. 2;

Fig. 5 is a longitudinal section through the combination camera and developer with an attached film holder;

Fig. 6 is a plan view of a combination camera and developer embodying the present invention in a modified manner;

Figs. 7 and 8 are sections taken on the lines 7—7 and 8—8, respectively, of Fig. 6;

Figs. 9 and 10 are perspective views of associated parts, respectively, of a combination camera and developer embodying the present invention in a further modified manner;

Fig. 11 is a longitudinal section through the modified camera and developer in which the parts of Figs. 9 and 10 are incorporated; and Fig. 12 is a fragmentary section taken on the line 12—12 of Fig. 11.

Referring to the drawings, and more particularly to Figs. 1 to 4 thereof, there are shown the complemental parts of a combination camera and developer in which the present invention is embodied. The instant combination camera and developer, hereinafter referred to for brevity's sake as "photographic adapter," is intended for use with a film holder 22 which may, but need not necessarily, be of a type commonly used in cameras. Such a film holder (Fig. 1) may comprise a frame 24 having a compartment 25 for the reception of a film $f$ for its exposure in a camera, either a conventional one or that provided by the instant photographic adapter. In accordance with customary procedure the film $f$ is in the dark placed in the compartment 25 of the film holder 22, and is thereupon sealed from extraneous light, until its exposure in the camera, by a slide 26 which is movable in a guideway 28 in the frame 24 into open and closed positions in which to uncover and cover, respectively, the film $f$ in the compartment 25. Further, the instant conventional film holder 22 is provided with a raised portion 29 of which the opposite sides are undercut to provide gibs 30 adapted to be slidingly received in the usual dove-tail guide at the open end of a conventional camera for removably mounting the film holder on the latter in light-sealing relation therewith for the exposure of the film $f$.

The instant photographic adapter comprises as one of its main parts a housing 20 which is open at one end 31 thereof and has preferably slanting side walls 36 which merge into the opposite end 38 (see also Fig. 5). The end 38 of the housing 20 is provided with a passage 40 which may conveniently be threaded for the quick reception of the threaded neck $n$ of a container C (Fig. 3), which may hold the particular liquid, such as developer, with which the exposed film *f* in the holder 22 is to be treated. In conformity with its exemplary adaptation to a conventional film holder such as that shown in Fig. 1, the housing 20 is in its open end 31 provided with a dove-tail guide 46 which may be similar to that provided in the open end of a conventional camera for the reception of the film holder 22. The dove-tail guide 46 in the housing 20 serves for the same purpose as the similar guide in the open end of a conventional camera, namely, for the removable mounting of the film holder 22 on the housing 20 in light-sealing relation therewith (Fig. 5).

Assuming that the film *f* in the holder 22 is exposed, and that the latter is attached to the housing 20 as shown in Fig. 5, by sliding the gibs 30 of the holder into the dove-tail guide 46 of the housing, the latter and the closed film holder mounted thereon may next be held in a position inverted from that shown in Fig. 5, so that the housing 20 is bottommost, whereupon the developer-holding container C may, after previous removal of the usual cap therefrom (not shown), be screwed with its neck *n* into the threaded passage 40 in the housing. The container C, which is preferably of a size so that it may conveniently be carried on one's person, is furthermore preferably made of metal or any other suitable light-impermeable material so that no extraneous light will be admitted into the interior of the housing 20 through the passage 40 therein when the container C is mounted. After mounting the container C on the housing 20 as described, the interior of the latter is effectively sealed from extraneous light and the slide 26 of the attached film holder 22 may safely be withdrawn in order to expose the compartment 25 and exposed film *f* therein to the interior of the housing. Preferably, the slide 26 is not completely withdrawn from the film holder 22, but only to an extent so as completely to expose the film *f* to the interior of the housing 20. In order to subject the exposed film *f* to the action of the developer, the housing 20 and attached film holder 22 thereon are next disposed similarly as shown in Fig. 5 in order to compel the developer to escape from the container C into the open compartment 25 of the holder. To prevent, or reduce to a negligible minimum, leakage of the developer from the housing 20 and attached film holder 22 thereon, the former may be provided in its open end 31 with any suitable gasket 52 (Figs. 2 and 5). Further, to prevent the developer from escaping through the guideway 28 in the holder 22, the slide 26 thereof is, as previously mentioned, preferably partly retracted to such an extent only that the film *f* is fully exposed to the interior of the housing 20. However, even if the slide 26 should be completely withdrawn from the holder 22, only a negligible amount, if any, of the developer would be permitted to escape through the guideway 28 in the holder due to the usual provision in the latter of a pad 27 of rubber, felt, or the like, which normally bears against the slide 26 to keep out extraneous light (Fig. 5).

After the film *f* is thus developed, the housing 20 and film holder 22 thereon may be inverted from the position shown in Fig. 5 so as to bring the container C lowermost for the return flow of the developer into the latter. Next, the slide 26 may be closed, whereupon the film holder 22 may be removed from the housing 20, or may be left thereon if the film is to be further treated in the housing 20. In the latter case, the container C on the housing 20 is replaced by a similar container holding the particular liquid with which the film is to be treated next. Thus, an exposed film in the holder 22 may be treated until finished, by subjecting it in the receptacle 20 successively to whichever liquids are required to that end.

The housing 20 and attachable container or containers C of the instant photographic adapter, may, insofar as their use for the development of exposed film is concerned, be exactly or substantially as the adapter shown and described in my co-pending application filed concurrently herewith and bearing Serial No. 98,767, now abandoned.

Over and above its use as a developer for exposed film, as described, the instant photographic adapter may also be used as a camera. To this end, the housing 20 of the instant adapter serves, in addition to its use as a development tank, also as the case of a camera for exposure of film in the holder 22, the camera to be completed by a releasably attachable conventional lens mechanism 60 (Fig. 4) which, in the present instance, is a combined lens and shutter mechanism. Being conventional in its construction and operation, no further description of the lens and shutter mechanism 60 is deemed necessary, save that the same is provided with a releasable attachment 62 to the housing 20 at the same place where the latter receives the container C for film development purposes. In the present instance, the attachment 62 of the lens and shutter mechanism 60 is in the form of a hollow threaded shank to be received in the passage 40 in the housing 20 in the manner shown in Fig. 5. With the lens and shutter mechanism 60 removably mounted on, and the film holder 22 releasably attached to, the housing 20 (Fig. 5), the latter functions as the case of a camera of which the lens and shutter mechanism 60 is the other part. After the exposure of a film *f* in the instant photographic adapter, the latter may quickly be converted into a film-developer wherein to develop and, if desired, further treat the film *f* just exposed without removing the film holder 22 from the housing 20. To this end, the slide 26 of the attached film holder 22 is, after the exposure of the film *f* therein, closed, whereupon the lens and shutter mechanism 60 is removed from the housing 20 and replaced thereon by the developer-holding container C. The development and, if desired, further treatment of the exposed film *f* in the attached holder 22 is then undertaken in the manner previously described.

Insofar as the use of the instant photographic adapter for film-development purposes is concerned, the same secures several important advantages which are described in my previously referred co-pending application. Thus, it is a distinct advantage of the instant photographic adapter that a film in a holder may immediately and in daylight be developed and, if desired, finished at the very location at which the film was exposed. By way of a further example of its advantageous use as a developer, the instant photographic adapter makes film holders available for repeated use. In addition to these and other advantages that spring solely from the unique application of the instant photographic adapter as a developer, its ready conversion from a developer into a camera, as described, secures additional important advantages. Thus, the instant photographic adapter dispenses with a separate camera, the structurally simple part 20 of the former and the attachable parts C and 60 taking the place of heretofore separate and relatively bulky equipment for exposing film and for developing the same. This important advantage springs primarily from the provision of the housing 20 and its dual use as the case of a camera and a development tank, respectively. Also, the instant photographic adapter will assuredly keep unexposed to harmful light an exposed film between the time of its exposure and the time of its development, unless it be so exposed through sheer negligence of the operator. For rinsing and draining purposes, the housing 20 may be provided with a passage (not shown) which may be closed by a plug 37 when not in use. The passage just mentioned may also be provided, if desired, with a light-sealed overflow conduit such as shown in my referred co-pending application.

Since the dual use of the instant photographic adapter precludes the necessity of using a separate camera for the exposure of film, and although the instant adapter is preferably constructed for the reception of conventional film holders of the type which are releasably attachable to conventional cameras, other film holders not necessarily attachable to conventional cameras may be used without disadvantage with the instant photographic adapter. Also, the lens and shutter mechanism 60, while shown and described as being completely removable from the housing 20, may in any one of several self-suggestive ways be carried by the housing 20 for movement thereon into and from operative relation with the passage 40 in the latter.

Figs. 6, 7 and 8 show a modified photographic adapter 70 which is especially, though not exclusively, suited for use with roll-film holders 72. Like the previously described photographic adapter, the instant modified adapter 70 comprises a housing 74, one or more interchangeably useable containers C' holding different film-treating liquids, respectively, and a lens and shutter mechanism (not shown) mountable interchangeably with the container or containers C' on the housing 74. The housing 74 is to this end provided in its end wall 76 with a passage 78, preferably threaded, for the releasable mounting therein of the threaded neck n' of a container C', or of the hollow threaded shank of a lens and shutter mechanism such as that shown in Fig. 4.

Special provisions are made on the instant modified photographic adapter for preventing, in its use as a developer, the passage of liquid to that part of the film supply in the attached roll-film holder which is not presently exposed within the confines of the exposure opening 80 in the latter. However, before describing these provisions, it is advisable, for a better understanding of the same, first to describe the characteristic construction of a roll-film holder, of which the one shown in Figs. 7 and 8 is, by preference, a conventional holder.

The roll-film holder 72 comprises, in the present instance, the usual face frame 82 having on three sides thereof marginal ribs 84 for its sliding support in the conventional dove-tail guide at the open end of a conventional camera. The frame 82 of the roll-film holder 72 is further provided with the above-mentioned exposure opening 80, as well as with the customary slide 86. Removably carried in any suitable manner by the frame 82 of the roll-film holder 72 is a casing 88 in which film supply and wind-up spools 90 and 92, respectively, are suitably removably mounted for rotation about their respective axes.

The unwound film f' between the spools 90 and 92 is passed over guide rolls 94 and 96, respectively, in the casing 88 which hold an exposure length or section f'' of the film in close proximity to the adjacent exposure opening 80 in the frame 82. The unwound film f' between the guide rolls 94 and 96 is furthermore resting against a backing plate 98 which is rigidly mounted in the casing 88. The film wind-up spool 92 is in a conventional manner (not shown) releasably connectible with the customary knob 100 on the outside of the casing 88 (Fig. 8) with which to rotate the wind-up spool for the purpose of bringing consecutive exposure lengths or sections of the film f within the confines of the exposure opening 80 in the frame 82.

The above-mentioned provision for preventing the flow of film-treating liquid into the interior of the film-storage casing 88 of the roll-film holder comprises, in the present instance, an endless liquid-sealing member 102, preferably of elastic sponge rubber or the like, which is suitably carried at the open end of the housing 74 of the instant photographic adapter, and adapted circumferentially to engage a film section f'' on the backing plate 98 in the film holder (Figs. 7 and 8). To accomplish such engagement between a film section f'' in the holder 72 and the sealing member 102, the latter is mounted on a raised rib-like formation 103 on the housing 74 which is movable into the exposure opening 80 in the frame 82 of the film holder in the fashion shown in Figs. 7 and 8. The film holder 72 is slidably supported at its marginal guide ribs 84 in a dove-tail guide 106 in a mounting frame 108 which forms a part of the instant modified photographic adapter, and in which the housing 74 is movable to and from liquid sealing relation with a film section f'' in the attached holder 72. Furthermore, the housing 74 is, within the mounting frame 108, retractible from the liquid-sealing position shown in Fig. 7 into a position in which to clear the film holder 72 when the latter is slid in place in the mounting frame 108. In the present instance, the housing 74 is normally yieldingly urged into the liquid-sealing position shown in Fig. 7 by springs 110 and 112 which, as shown in Fig. 8, are interposed between a circumferential flange 114 on the housing 74 and opposite overhanging lugs 116, respectively, on the mounting frame 108. In order to prevent harmful extraneous light from entering the interior of the housing 74 between the latter and the surrounding mounting frame 108, the former suitably carries at the circumference of its flange 114 a light-sealing member 120 of any suitable material which bears against, and is slidable on, the adjacent inner wall surfaces 122 of the mounting frame 108 in the fashion shown in Figs. 7 and 8.

Provisions may also be made on the housing 74 of the instant photographic adapter for readily retracting the same in the mounting frame 108. To this end, the housing 74 may conveniently be provided on two opposite sides thereof with external finger grips 126, respectively, between which and the adjacent lugs 116, respectively, of the mounting frame 108 an operator may force or wedge the fingers of one of his or her hands in order to accomplish the desired retraction of the housing 74 relative to the mounting frame 108.

While the instant modified photographic adapter 70 is especially suited for use with a roll-film holder or holders, it is by no means so restricted in its use, but may obviously be used in conjunction with a single-film holder of the type shown in Fig. 1, for instance. Also, while the instant photographic adapter 70 is in the mounting frame 108 thereof provided with the dove-tail guide 106 for the reception of a conventional film-holder 72, any other roll-film holder which is not necessarily attachable to a conventional camera may be used with the instant photographic adapter, merely by making suitable provisions on the mounting frame 108 for the releasable attachment thereto of such other roll-film holder.

While in the modified photographic adapter shown in Figs. 6 to 8, the housing 74 thereof is normally spring-urged in the mounting frame 108 into sealing relation with a roll-film holder attached thereto, Figs. 9 to 12 show a further modified photographic adapter 130 which deviates from the above modified adapter by having its housing 132 normally retracted from the mounting frame 134 thereof. The mounting frame 134 is, in the present instance, provided with a dove-tail guide 136 for the reception of a conventional film holder, and particularly a roll-film holder which may be of the same type as that shown in Figs. 7 and 8. The housing 132 projects into an opening 138 in the mounting frame 134 and is normally held therein in the retracted position shown in Fig. 11 by any suitable spring means. In the present instance, the spring means for normally retracting the housing 132 is a pad 140 of elastic sponge rubber, for instance, which is disposed between the mounting frame 134 and an outwardly projecting circumferential ledge 142 on the housing 132. While the mounting frame 134 and the housing 132 are shown as separate parts in Figs. 9 and 10, they are in their assembled relation preferably held against separation by members 142 which are conveniently in the form of angle brackets suitably secured at 144 to the mounting frame 134. The housing 132 is provided with an endless sealing member 146, which may be of elastic sponge rubber or any other suitable material, and is adapted to engage an exposed film section in a roll-film holder attached to the frame 134. In order to bring the housing 132 with the sealing member 146 thereof into sealing relation with an exposed film section in an attached film holder, depression, preferably manual, of the housing 132 is required (Fig. 12). In order that the housing 132 may, in its depressed position, be held against retraction by the compressed pad 140, the mounting frame 134 is preferably provided on two opposite sides thereof with pivotally mounted, preferably slightly resilient clips 150, respectively, which may be hooked over the ledge 142 on the housing 132 in the fashion shown in Fig. 12. Like the housing 20, the housing 132 of the instant modified photographic adapter 130, and also the housing 74 of the previously described modified photographic adapter 70, may be provided with a drain passage (not shown) which, when not in use, may be closed by a plug (not shown).

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. A combination camera and developer comprising a frame member having an opening defined therein, a housing open at opposite sides thereof and mounted on said frame, one of said housing sides being disposed in said frame opening, a film holder removably mounted on said frame in opposition to said one housing side for closing the opening therein, said film holder having defined therein a film exposure opening in registry with the opening in said one housing side and being provided with means to support film at said exposure opening, a shield slidably carried by said film holder to overlie and to expose said exposure opening, said housing being movable relative to said frame for moving said one housing side in the frame opening into first and second positions in which said one housing side is in and out of sealing relation, respectively, with the film at said exposure opening, lens means, a liquid tank, and means provided in said housing at the opening in the other of said sides for the releasable interchangeable attachment thereto of said lens means and said tank.

2. A combination camera and developer, as defined in claim 1, further comprising resilient means interposed between said frame member and said housing for normally yieldingly urging said housing into said first position.

3. A combination camera and developer, as defined in claim 1, further comprising spring means carried by said frame member and acting upon said housing for normally yieldingly urging said housing into said first position.

4. A combination camera and developer, as defined in claim 1, further comprising resilient means interposed between said frame member and said housing for normally yieldingly urging said housing into said second position, and means interengaging said frame member and said housing for releasably retaining the latter in said first position.

5. A combination camera and developer, as defined in claim 1, wherein said film holder is provided with a face frame in sliding engagement with said frame member, said exposure opening being defined in said face frame, a casing removably mounted on said face frame, and film spools carried in said casing for moving an exposure length of the film on said film support means.

JOHN BASS.

REFERENCES CITED

The following references are of record in the file of this patent:

UNITED STATES PATENTS

| Number | Name | Date |
|---|---|---|
| 16,979 | Kellogg | Apr. 7, 1857 |
| 685,221 | Quincey | Oct. 22, 1901 |
| 707,450 | Rimailho | Aug. 19, 1902 |
| 1,298,312 | Earle | Mar. 25, 1919 |